Aug. 7, 1956    A. O. ZACUR    2,757,783
CONVEYOR
Filed April 4, 1952

INVENTOR:
ALEX O. ZACUR
BY John F. Schmidt
ATTORNEY

United States Patent Office 2,757,783
Patented Aug. 7, 1956

2,757,783

CONVEYOR

Alex O. Zacur, Indiana, Pa., assignor to Joy Manufacturing Company, Pittsburgh, Pa., a corporation of Pennsylvania Application April 4, 1952, Serial No. 280,545

1 Claim. (Cl. 198—171)

This invention relates to a conveyor, and more particularly to a hold-down device for the flights of a conveyor.

It frequently happens in flight conveyors that a portion of the conveyor must be disposed at an angle to another portion thereof, the angle in question being one which lies in a substantially vertical plane. This situation may arise in a conveyor having a fixed angle, or in one in which the angle is adjustable by one means or another. Where the angle opens upward, a problem arises in connection with the flights leaving the conveyor deck in the vicinity of the angle or bend, with the result that the material being conveyed piles up on the deck, especially in the vicinity of the bend, whereupon the flights begin to ride over the top of the material. Under these circumstances, material often accumulates under the flights to such an extent that the conveyor becomes inoperative, the chain breaks, or some other damage is suffered by the conveyor mechanism. In such cases, many efforts have been made to design hold-down devices for the flights, these devices normally consisting of projections from the conveyor sides which engage the ends of the flights. As heretofore designed such hold-downs have been unsatisfactory because they tend to accumulate material being conveyed under the projections, with the result that such hold-downs often create more problems than they solve.

It is an object of this invention to provide a hold-down device for flight conveyors which is so designed that material will not accumulate in or in the vicinity of the hold-down device. This and other objects are accomplished in a hold-down device which presents smooth, rounded surfaces to the material being conveyed, and which has one or more elements spaced from the sides of the conveyor trough sufficiently to prevent accumulation of material being conveyed. Other objects will be apparent to those skilled in the art.

Figure 1:
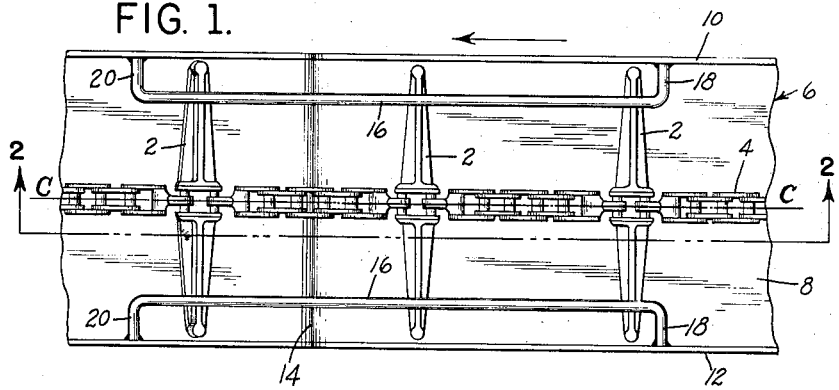
Fig. 1 is a top plan view of a flight conveyor bent in a vertical plane and provided with a hold-down device made according to this invention.
Figure 2:
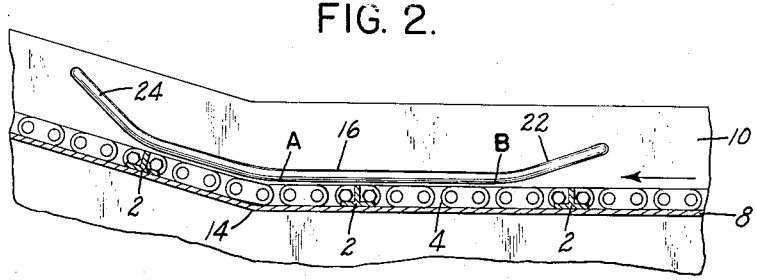
Fig. 2 is a view in section substantially on line 2—2 of Fig. 1.

Referring now to Figs. 1 and 2 a portion of a conveyor is there shown, the conveyor being of the type in which a plurality of spaced flights 2 on a chain 4 are moved by any suitable power driven means along a trough indicated generally at 6 and having a deck 8 and sides 10 and 12, and a geometrically locatable centerline here shown as C—C. The trough is formed with a bend at 14, the bend 14 forming an angle lying in a substantially vertical plane, such a plane being any of a number of planes parallel to the plane of the section of Fig. 2. In the embodiment shown in Figs. 1 and 2, and as will best be understood by reference to Fig. 2, the tension in the chain which is necessary to move the flights from right to left as seen in the drawing, has a tendency to lift the flights 2 off the deck 8. In the absence of some means to hold the flights close to the deck, the chain and flights would form a curve approximating a catenary. The formation of such a curve would of course result in the flights 2 being lifted off the deck in the vicinity of the bend at 14, and for considerable distances on both sides of the bend.

To keep the flights 2 substantially in contact with the deck and therefore in position to push material along the deck, a hold-down device according to my invention is provided. This hold-down device comprises a pair of elongated rod-like members 16 having smooth, rounded contours to the end that no material being conveyed will catch on the members 16, as for example would be the case if jagged edges were presented to the material being conveyed.

Means are supported by the trough to secure the members 16 adjacent to but spaced from the sides of the trough. Those skilled in the art will perceive numerous variations of the means shown, but I have illustrated such support means as consisting merely of the ends of the elongated members bent outward at least as shown at 18, and preferably also at 20, and secured to a trough side in any suitable manner, as for example by welding. It is further noted that the elongated members are supported on the trough in such a manner as to extend in a direction substantially parallel to the trough sides, or from the viewpoint of the ends 18, extending forward in the direction of normal flight movement.

As is best seen in Fig. 2, each member 16 is spaced from the deck 8 throughout the major portion of its length by an amount substantially equal to the thickness of a flight 2, in order to hold the flight 2 close to the deck so that it may carry out its conveying or material moving function. In order to accommodate the small amount of vertical movement which the flights 2 are likely to encounter in approaching the hold-down device, the rearmost ends of the members 16 are preferably bent upward so as to form with the deck an angle which opens toward the rear, this end portion being designated 22 in the drawings. Where the conveyor chain will never be reversed, the elongated member 16 need be provided with such approach angles only at the rearmost extremities, but in conveyors in which the chain must occasionally be reversed for any reason, the members 16 are preferably provided with similar approach angles at their forward ends, as shown at 24.

It may be further noted that the members 16 are preferably provided with a substantially straight portion in that region traversed by the flights before reaching the bend 14, said substantially straight portion being preferably of a length equal to the distance between flights. I have illustrated this length as being the portion of the member 16 in Fig. 2 that lies between the points of tangency A and B. In other words, the length of member 16 between points A and B is preferably at least as much as the spacing between adjacent flights 2.

Figure 3:
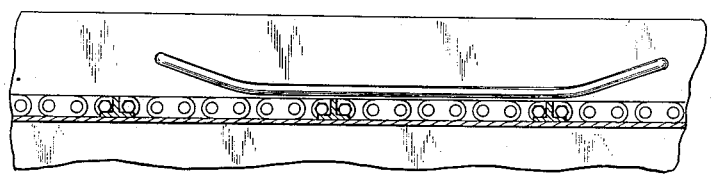
Fig. 3 is a view similar to Fig. 2, but showing another application of the invention.

Fig. 3 shows another application of my invention, the conveyor shown in Fig. 3 consisting merely of a conventional straight line conveyor, i. e., not having any vertical bend in it similar to the bend 14 of Figs. 1 and 2. There are often applications in straight conveyors in which the flights have a tendency for one reason or another to lift off the deck at certain critical points. Such lifting of the flights off the deck can be prevented by the application of a hold-down device made according to my invention.

Figure 4:
Fig. 4 is a partial top plan view showing another embodiment of the invention.

Fig. 4 shows another embodiment of my invention, in which the ends 118 and 120 form an acute angle with

3 the side 110 instead of a perpendicular angle as shown in Fig. 1.

Operation

The operation of my invention will be readily evident to those skilled in the art, so need be but briefly discussed here. As a flight approaches the hold-down device, it is guided by the angle of approach formed by the rearmost end of the elongated member and the deck. At the rearmost end, each member 16 is of course spaced from the deck by a distance substantially greater than the thickness of a flight, but after the flight passes the point B, it is constrained to move very close to the dock and is thereby prevented for lifting off the deck due to the tension in the chain 4.

Material being conveyed along the trough by the flights 2 can easily tumble or flow over and around the smooth, rounded contours of the elongated rod-like members 16. No sharp edges or corners are presented to "hook" or engage lumps of material being conveyed, and cause such material to accumulate underneath or in the vicinity of the hold-down device.

It will be evident to those skilled in the art that I have here provided a hold-down device for conveyors which keeps conveyor flights in engagement with or close to the deck but which does not permit the accumulation of material being conveyed in the region of the hold-down device. Other advantages will be apparent to those skilled in the art.

While this application specifically describes at least two forms which the invention may assume in practice, it will be understood that these forms are shown for purposes of illustration, and that the invention may be modified and embodied in various other forms without departing from its spirit or the scope of the appended claims.

What I claim as new and desire to secure by Letters Patent is:

In a conveyor of the type in which a center chain moves a plurality of spaced flights along a trough which has a deck and opposite sides extending upwardly from the deck, in which trough the flights are moved by the center chain with their opposite ends in adjacency to the trough sides, and in which conveyor the chain and flights depend, for limiting their lifting from the trough deck, on coaction with the flight ends of hold down means at each of the opposite sides of the trough fixed to, the projecting inwardly from, the trough sides, the improvement which consists in having the hold down means in the form of rod-like elements each comprising an intermediate rod-like portion extending longitudinally of the trough and end portions at the opposite ends of said intermediate portion each diverging upwardly from the direction of the end of the intermediate portion adjacent to it, said end portions fixed to said trough sides and approaching the latter at a relatively narrow angle and said intermediate portion spaced above the deck a distance slightly exceeding the elevation of the flight ends above the deck when the center chain contacts the deck and having throughout at least most of its length a spacing from the trough side to which its associated ends are fixed exceeding the distance aforesaid and providing an opening, between said intermediate portion and said side, unobstructed from above, whereby any material moved towards said trough side beneath said intermediate portion can escape upwardly through such opening.

References Cited in the file of this patent

UNITED STATES PATENTS

| | | |
|---|---|---|
| 779,465 | Carr | Jan. 10, 1905 |
| 1,315,713 | Finkle | Sept. 9, 1919 |
| 1,375,060 | Newdick | Apr. 19, 1921 |
| 1,560,680 | Fernandes | Nov. 10, 1925 |
| 2,366,407 | Jeffrey | Jan. 2, 1945 |
| 2,512,610 | Cartlidge | June 27, 1950 |
| 2,516,798 | Peterson | July 25, 1950 |
| 2,547,270 | Kunz | Apr. 3, 1951 |
| 2,554,589 | Patz | May 29, 1951 |
| 2,569,004 | Joy | Sept. 25, 1951 |
| 2,646,158 | Vodoz | July 21, 1953 |